Patented Aug. 22, 1944

2,356,163

UNITED STATES PATENT OFFICE 2,356,163

VULCANIZATION OF RUBBER

Paul C. Jones and Roger A. Mathes, Akron, Ohio, assignors to The B. F. Goodrich Company, New York, N. Y., a corporation of New York No Drawing. Application December 5, 1939, Serial No. 307,635

10 Claims. (Cl. 260—788)

This invention relates to the vulcanization of rubber and has as its object to provide a new and effective class of vulcanization accelerators.

We have discovered that aminoalkyl sulfides having the general structural formula

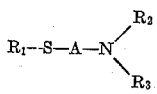

wherein $R_1$ is an organic radical with the free valence on a carbon atom, A is an alkylene group with the free valences on different carbon atoms, $R_2$ is a member of the class consisting of hydrogen, aliphatic, and aromatic groups, and $R_3$ represents a member of the class consisting of hydrogen and aliphatic groups, are excellent accelerators.

The $R_1$—S— portion of the compound may be regarded as the residue formed by removing the —H from the —SH group of a sulfhydryl compound. Suitable sulfhydryl compounds from which the accelerators of this invention may be considered as derived include methyl mercaptan, ethyl mercaptan, isopropyl mercaptan, allyl mercaptan, cyclohexyl mercaptan, benzyl mercaptan, thiophenol, ortho, meta, or para thiocresol, alpha or beta thionaphthol, 1-thioanthrol, thioanthranol, p-chlorthiophenol, p-methoxythiophenol, o-anilinothiophenol, methanecarbothiolic acid, methanecarbodithioic acid, ethanecarbodithioic acid, benzene-carbodithioic acid, 3-furanecarbodithioic acid, ethyl-xanthogenic acid, dimethyldithiocarbamic acid, methyl-ethyl-dithiocarbamic acid, ethyldithiocarbamic acid, methyl-phenyl-dithiocarbamic acid, ethyl-benzyl-dithiocarbamic acid, diphenyldithiocarbamic acid, phenyl-alpha-naphthyl-dithiocarbamic acid, phenyl-para-chlorphenyl-dithiocarbamic acid, o,o'-dimethylmethylenediphenyldithiocarbamic acid, phenyl-para-hydroxyphenyl-dithiocarbamic acid, phenyl-anilino-phenyl-dithiocarbamic acid, mercaptothiazole, mercaptobenzothiazole, mercaptobenzoxazole, mercaptobenzimidazole, mercapto-4,5-dimethyl thiazole, mercapto-4-methyl-5-ethyl-thiazole, mercapto-4-phenylthiazole, mercaptothiazoline, mercapto-4,5-dimethylthiazoline, mercaptopenthiazoline, mercaptometathiazine, mercaptooxazine, mercaptoquinoline, etc.

A is preferably a lower alkylene group such as ethylene, propylene, 2-methylethylene, etc.

$R_2$ and $R_3$ may be aliphatic groups such as alkyl, cycloalkyl, aralkyl, hydroxyalkyl, alkoxyalkyl, aminoalkyl, or haloalkyl groups, while $R_2$ may also be an aromatic group. In the preferred groups of compounds, $R_2$ and $R_3$ are hydrogen or hydrocarbon groups or amino substituted hydrocarbon groups. In the latter case

is derived from polyamines such as ethylene diamine, triethylene tetramine, para-phenylene diamine, etc.

Typical aminoalkyl sulfides within the scope of this invention include:

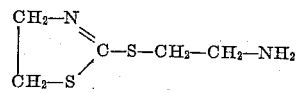

Thiazolinyl 2-aminoethyl sulfide
Thiazolinyl 2-aminopropyl sulfide
Thiazolinyl 2-aminobutyl sulfide

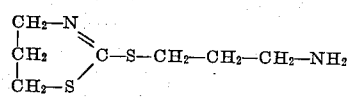

Penthiazolinyl 3-aminopropyl sulfide

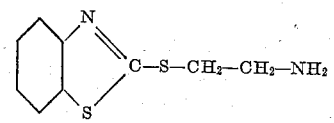

Benzothiazyl 2-aminoethyl sulfide
Benzothiazyl 2-anilinoethyl sulfide
Benzothiazyl 2-diethylaminoethyl sulfide
Benzothiazyl 2-cyclohexylaminoethyl sulfide

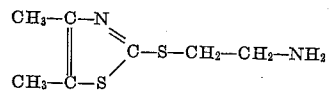

4,5-dimethylthiazyl 2-aminoethyl sulfide

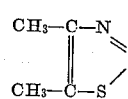 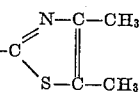

N,N'-bis-4,5-dimethylthiazylthioethyl ethylene diamine

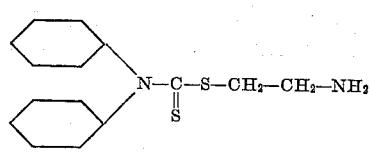

Diphenylthiocarbamyl 2-aminoethyl sulfide

As a specific example of the method of this invention, accelerators within the class herein defined were incorporated in the following rubber composition:

| | |
|---|---|
| Rubber | 100 |
| Zinc oxide | 5 |
| Lauric acid | 3 |
| Sulfur | 3.5 |
| Accelerator | 1 | when the rubber compositions were cured for varying times at 287° F., vulcanizates having the following properties were obtained, T representing tensile strength at break in lbs./in.$^2$ and E representing ultimate elongation in per cent:

| Time in min. | T | E |
|---|---|---|
| THIAZOLINYL 2-AMINOETHYL SULFIDE | | |
| 15 | 3,250 | 810 |
| 30 | 3,580 | 765 |
| 4,5-DIMETHYLTHIAZYL 2-AMINOETHYL SULFIDE | | |
| 15 | 3,340 | 805 |
| 30 | 3,970 | 720 |
| BENZOTHIAZYL 2-AMINOETHYL SULFIDE | | |
| 15 | 2,960 | 855 |
| 30 | 3,800 | 780 |

It will be noted that lauric acid was included in the above compositions. It is generally true of the accelerators of this invention, however, that they do not require any acid to effect good cures, regardless of the activity of the compounds from which they are derived. Thus although 2-mercaptothiazoline possesses little activity as an accelerator in the absence of fatty acid, the above composition containing thiazolinyl 2-aminoethyl sulfide but no lauric acid attains a tensile strength of 3000 lbs./in.$^2$ when cured for 30 min. at 287° F. and of 3600 lbs./in.$^2$ when cured for 60 min. at 287° F.

It is to be understood that the specific examples given above are merely illustrative of one manner of the use of the accelerators of this invention; that other accelerators within the scope of the class herein defined may be substituted for the specific compounds used in the examples; that the accelerators of this invention may be used to vulcanize a rubber broadly, including caoutchouc, balata, gutta percha, synthetic rubber of the types which undergo vulcanization when heated with sulfur, or natural or artifically prepared latex; that the accelerators may be incorporated in the rubber by mastication or milling, or in the case of latex or other dispersion or solution, by simply dissolving or suspending the accelerator therein; that the accelerators may be used in admixture with each other or with other known accelerators or with antioxidants, organic acids, amines, softeners, activators, retarders, pigments, fillers, etc.; and that the rubber may be vulcanized with the assistance of this new class of accelerators in heated molds, hot air, steam, hot water, etc. The accelerators of this invention may advantageously be used in as low a proportion as 0.05% of the rubber in the composition, in which case 3 to 5% of sulfur is generally required or as high as 5%, with a much reduced quantity of sulfur.

This invention is accordingly not limited to the specific examples herein set forth, for it will be obvious to those skilled in the art that many modifications such as using other materials having equivalent properties and varying the proportions of materials used are within the spirit and scope of the invention as defined in the appended claims.

We claim:

1. The method which comprises vulcanizing a rubber in the presence of a compound having the structural formula

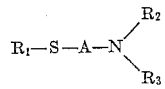

wherein $R_1$ is an organic radical with the free valence on a carbon atom, A is an alkylene group containing not over three carbon atoms and with the free valences on different carbon atoms, and $R_2$ and $R_3$ are hydrogen atoms.

2. The method which comprises vulcanizing a rubber in the presence of a thiazyl unsubstituted aminoethyl sulfide.

3. The method which comprises vulcanizing a rubber in the presence of benzothiazyl 2-aminoethyl sulfide.

4. The method which comprises vulcanizing a rubber in the presence of 4,5-dimethylthiazyl 2-aminoethyl sulfide.

5. The method which comprises vulcanizing a rubber in the presence of thiazolinyl 2-aminoethyl sulfide.

6. An unvulcanized rubber composition containing a rubber, a vulcanizing agent, and a compound having the structural formula

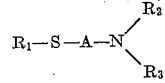

wherein $R_1$ is an organic radical with the free valence on a carbon atom, A is an alkylene group containing not over three carbon atoms and with the free valences on different carbon atoms, and $R_2$ and $R_3$ are hydrogen atoms.

7. An unvulcanized rubber composition containing a rubber, a vulcanizing agent, and a thiazyl unsubstituted aminoethyl sulfide.

8. An unvulcanized rubber composition containing a rubber, a vulcanizing agent, and benzothiazyl 2-aminoethyl sulfide.

9. An unvulcanized rubber composition containing a rubber, a vulcanizing agent, and 4,5-dimethylthiazyl 2-aminoethyl sulfide.

10. An unvulcanized rubber composition containing a rubber, a vulcanizing agent, and thiazolinyl 2-aminoethyl sulfide.

PAUL C. JONES.
ROGER A. MATHES.